Dec. 30, 1941.  E. T. VINCENT  2,268,271
SLEEVE VALVE ENGINE
Filed Jan. 17, 1940  3 Sheets-Sheet 2
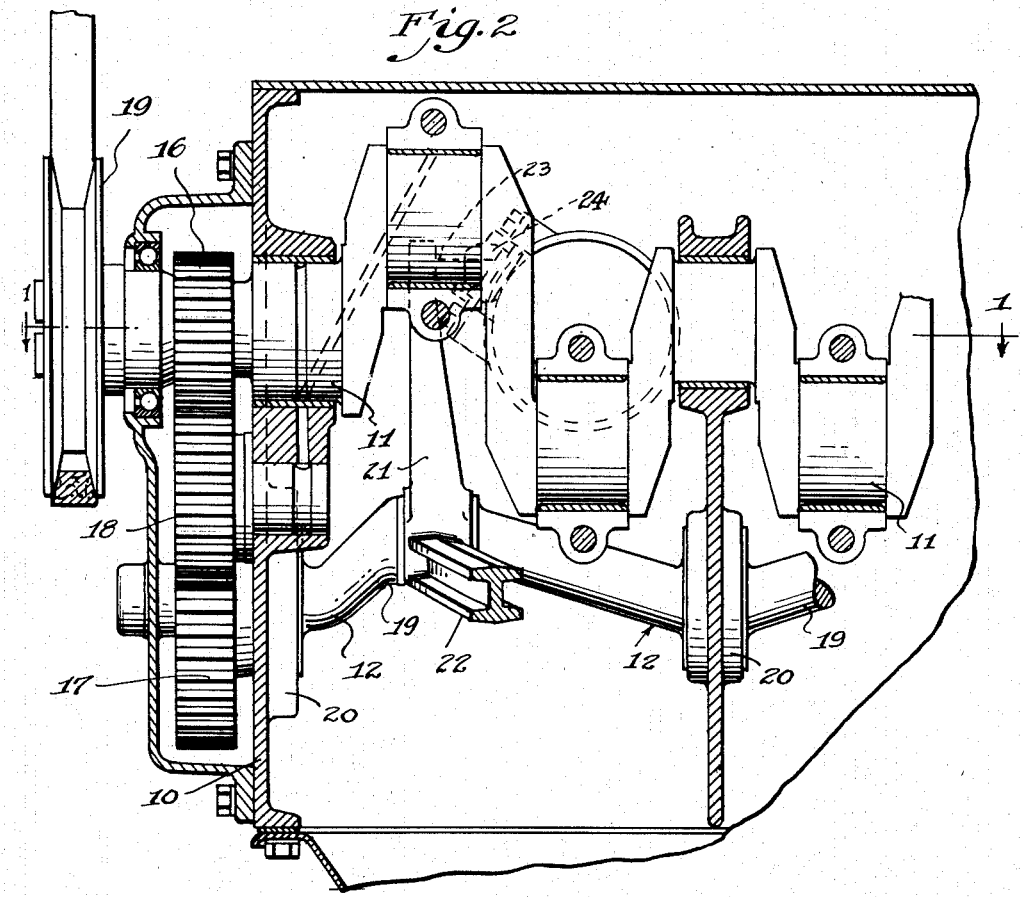
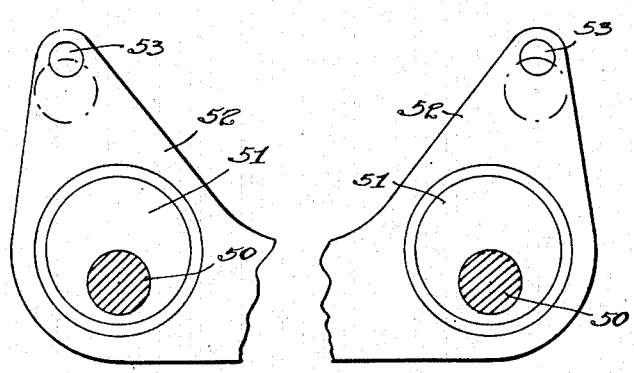
INVENTOR.
Edward T. Vincent
ATTORNEY.

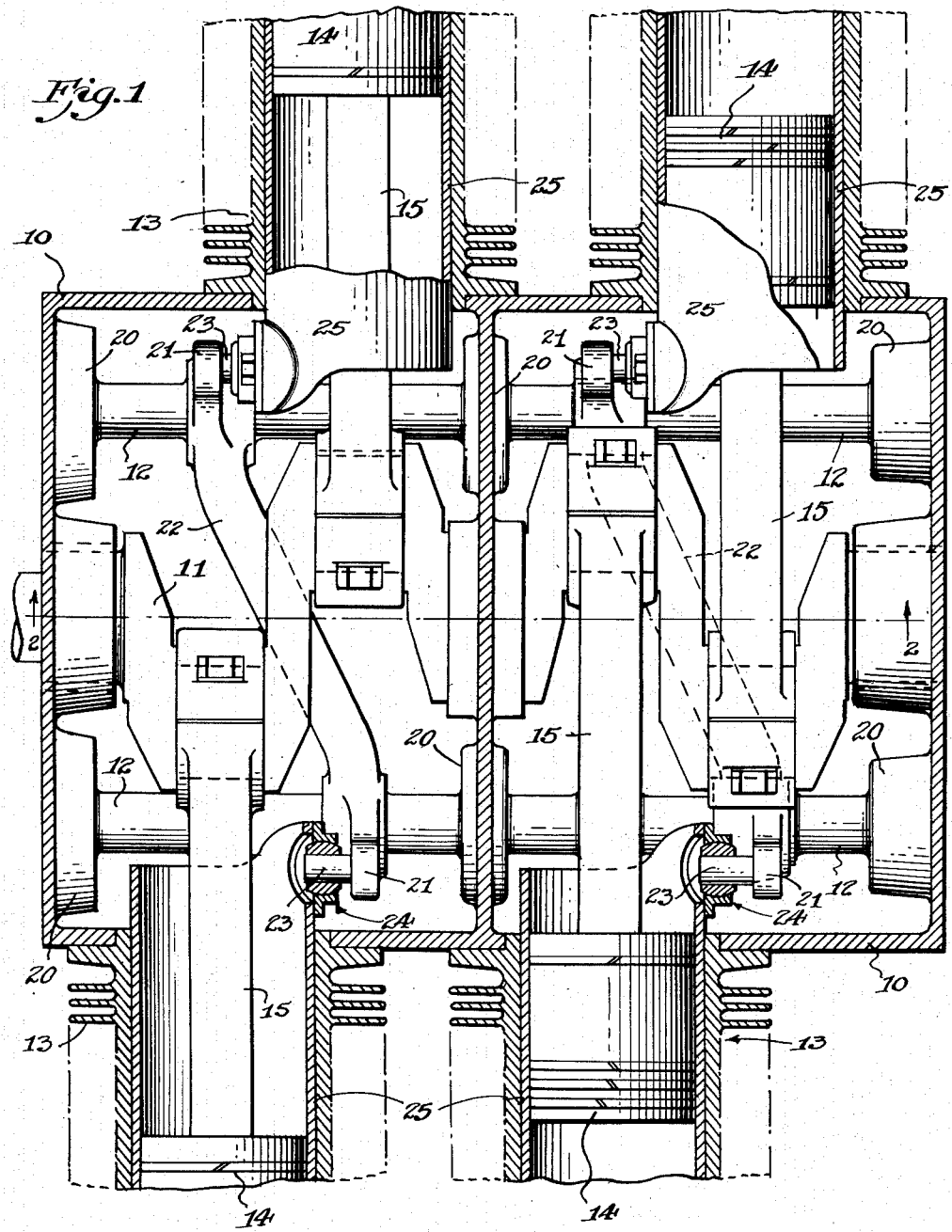

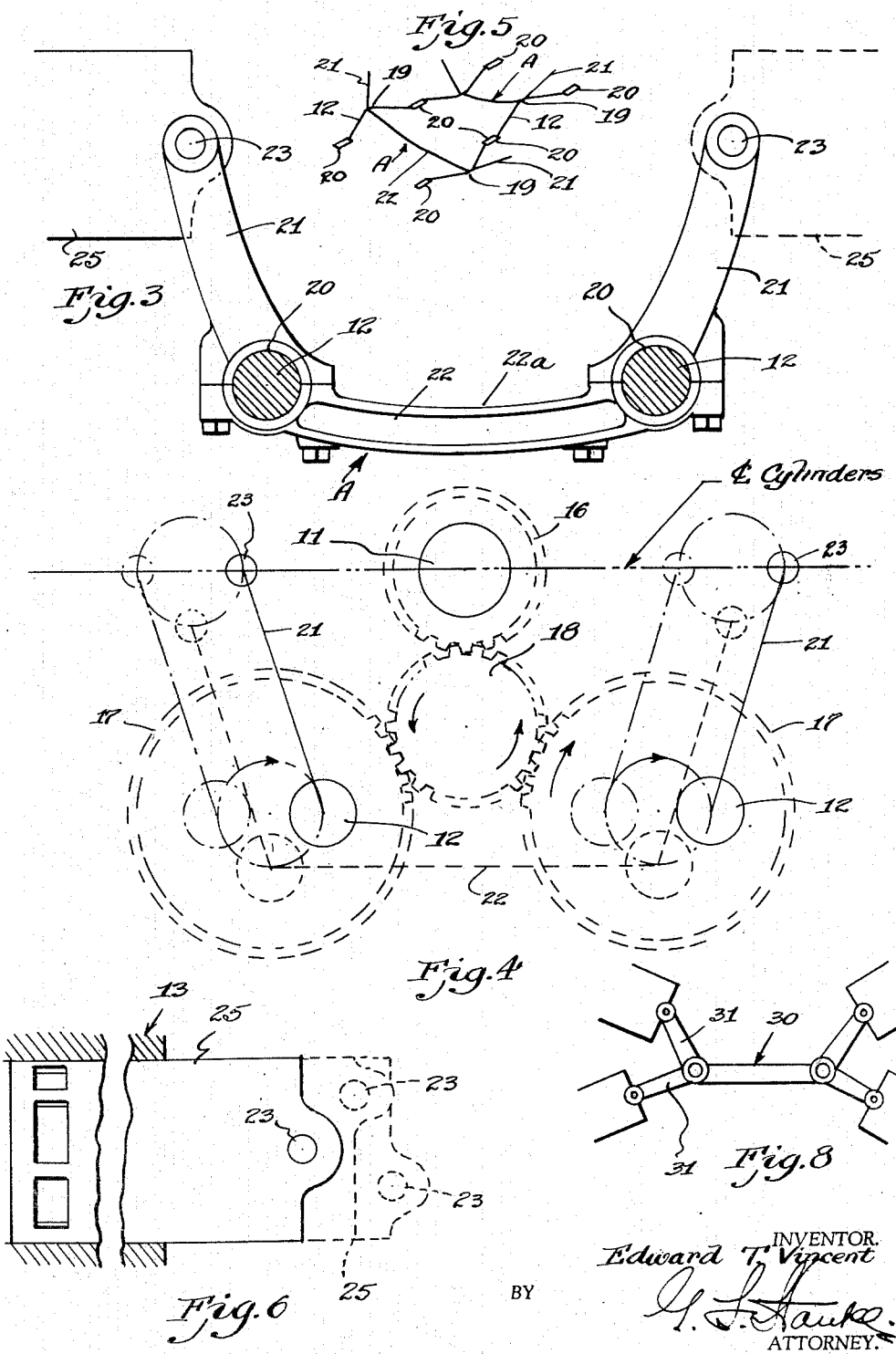

Patented Dec. 30, 1941

2,268,271

UNITED STATES PATENT OFFICE 2,268,271

SLEEVE VALVE ENGINE

Edward T. Vincent, Ann Arbor, Mich., assignor, by mesne assignments, to Continental Aviation and Engineering Corporation, a corporation of Virginia Application January 17, 1940, Serial No. 314,254

9 Claims. (Cl. 123—81)

My invention relates to engines and more particularly to a sleeve valve engine and to the sleeve driving mechanism utilized to impart movement to the sleeve valves. More particularly the present sleeve driving mechanism is one which imparts a combined reciprocating and oscillating movement to the sleeve valves of a multi-cylinder internal combustion engine for controlling engine intake and exhaust.

It will be noted that various types of sleeve valve engines create manifold problems as regards the sleeve driving or actuating mechanism. The present invention is more particularly applicable to an inline sleeve valve engine particularly one of the type having opposed cylinders, although it will be obvious that the principles of my invention may be applied to a sleeve valve engine in which the cylinders are positioned so that the axes of said cylinders extend at an angle to each other or may be embodied in a straight inline engine. In the accompanying drawings I have chosen to illustrate my invention as being embodied in an engine, in which the axes of the cylinders extend at an angle of 180 degrees to each other.

One of the objects of my present invention is to provide a sleeve drive which has proved to be successful and which accomplishes the desired results with a minimum of friction and loss in power.

Another object of my present invention is to provide an improved sleeve valve driving mechanism particularly applicable to an engine having opposed cylinders which are staggered relative to each other.

A still further object of the present invention is to provide an improved sleeve valve driving mechanism by providing a simplified mechanism adapted to be assembled with an engine with a minimum of waste space and which is, furthermore, operable to positively actuate the sleeve valves with a minimum of maintenance cost.

More particularly, my invention has for its object to facilitate the assembly of a sleeve drive mechanism in an inline engine without the use of angled cranks or their equivalent.

For a more detailed understanding of my invention, reference may be had to the accompanying drawings illustrating preferred embodiments thereof in which like characters refer to like parts throughout the several views, and in which:

Fig. 1 is a plan sectional view of an engine embodying my novel sleeve driving mechanism, said view being taken substantially on the line 1—1 of Fig. 2, Fig. 2 is a vertical sectional view of my improved engine structure taken substantially on the line 2—2 of Fig. 1, Fig. 3 is an elevational view of the sleeve driving member, Fig. 4 is a diagrammatic view illustrating the sleeve driving connections with the engine crankshaft and showing a plurality of positions which will be assumed by the mechanism, Fig. 5 is a detail perspective diagrammatic view of the sleeve crank drive mechanism, Fig. 6 is a diagrammatic view showing the sleeve movement, Fig. 7 is a fragmentary detail view of the sleeve driving mechanism, showing an eccentric drive in place of the crank drive illustrated in Figs. 1 and 2, and Fig. 8 is a diagrammatic view showing how the present mechanism can be adapted to an X-type engine.

The internal combustion engine herein illustrated in Figs. 1 to 5 inclusive comprises in general, a crankcase 10 which supports a crankshaft 11 and a pair of sleeve driving lay-shafts or valve shafts 12. Cylinders 13 are secured to the crankcase and in the present instance, the cylinders are arranged as opposed cylinders. It will be noted that the cylinders of one bank are staggered with relation to the cylinders of the other bank and that the crankshaft is constructed as a conventional 4-throw crank connected with pistons 14 operable in said cylinders by means of connecting rods 15.

The valve shafts or lay-shafts 12 are driven from the engine crankshaft by gearing, a conventional crankshaft gear 16 being secured to the crankshaft to drive the gears 17 secured to the valve shafts 12 by means of an intermediate idler gear 18. It will be noted that this gearing is constructed to provide a driving reduction to the valve shafts so that the valve shafts rotate at one-half crankshaft speed. A pump drive sheave or pulley 19 is secured to the crankshaft in a conventional manner. Obviously in a two stroke cycle engine the valve shafts would be rotated at crankshaft speed.

The valve shaft 12 includes crank portions 19 and is provided with suitable bearing portions 20. The sleeve drive member A is preferably constructed substantially U-shaped in elevation and consists of arms 21 rigidly secured or bolted to the cross member 22. The extremities of the arms 21 each carry a pin 23, and it will be noted that as the sleeve cranks 19 are revolved, an orbital movement will be imparted to the sleeve drive member A. This orbital path travelled by the drive member A imparts a similar orbital path to each of the arms 21, these arms 21 carrying pins 23 which connect with the ball and socket couplings 24 carried by the sleeve valves 25. The sleeve valves are thus moved in an orbital path anad have a combined reciprocal and oscillating movement with respect to the cylinders. It may be further noted that the cross member 22 is downwardly bowed as at 22a and is arranged to clear the engine crankshaft during engine operation.

It will be noted that the arrangement shown and described in the present application provides a sleeve driving member whose arms drivingly connect with sleeve valves operating in oppositely positioned cylinders and that each pair of cylinders, one in each bank, have sleeve valves which are driven from a common sleeve drive member.

As shown in Fig. 8 it will be noted that the sleeve drive member 30 carries at each end thereof a plurality of arms 31 which are connected to sleeve valves on a plurality of cylinders. This type of construction is preferably embodied with an X-type engine.

It will plainly be seen that the principles of my invention are applicable to other types of sleeve valve engines as well as to the particular type described above.

In Fig. 7 I have shown the layshafts 50 as driving eccentrics 51, which in turn actuate the sleeve actuating member 52, which is connected to drive the sleeve valves by crank pins 53 in a manner similar to the drive shown in Figs. 1 to 3 inclusive. In the preferred form the layshaft carries cranks 19 and these eccentrics 51 are the full equivalent of the aforesaid cranks.

Although I have illustrated but one form of my invention it will be apparent to those skilled in the art to which my invention pertains, that various changes and modifications may be made therein without departing from the spirit of my invention or from the scope of the appended claims.

I claim:

1. In a sleeve valve internal combustion engine, an engine structure including a plurality of banks of aligned engine cylinders, sleeve valves operable in said cylinders, a sleeve drive member comprising a strut extending transversely of the engine structure and the opposite ends thereof operatively attached respectively to a sleeve valve associated with each bank of cylinders, and means for actuating said sleeve member and causing same to move in an orbital path.

2. A sleeve valve engine comprising an engine structure including a pair of associated engine cylinders, a crankshaft, said cylinders inclined at an angle to each other relative to said crankshaft, sleeve valves operable in said cylinders, a sleeve drive member comprising a strut extending transversely of the engine structure and the opposite ends thereof operatively attached respectively to each of said sleeve valve means, and means for actuating said sleeve member to move same in an orbital path.

3. A sleeve valve engine comprising an engine structure including opposed engine cylinders, a crankshaft common to said cylinders, sleeve valves operable in said cylinders, a sleeve drive member having a pair of sleeve drive arms connecting with the sleeve valves in said opposed engine cylinders, and driving means consisting of at least a pair of driving instrumentalities driven by said crankshaft and operatively connected with said sleeve drive member at spaced points, said means constructed and arranged to impart an orbital movement to said member.

4. A sleeve valve engine comprising an engine structure including opposed engine cylinders, a crankshaft common to said cylinders, sleeve valves operable in said cylinders, a sleeve drive member consisting of a pair of sleeve actuating arms and an interconnecting strut extending beneath said crankshaft, and spaced driving instrumentalities each rotating about axes extending parallel to the crankshaft and operatively connected to said member to move same in an orbital path.

5. A sleeve valve engine comprising an engine structure including opposed engine cylinders, a crankshaft common to said cylinders, sleeve valves operable in said cylinders, a sleeve drive member consisting of a pair of sleeve actuating arms and an interconnecting strut extending beneath said crankshaft, and spaced driving instrumentalities each rotating about axes extending parallel to the crankshaft and operatively connected to said member adjacent opposite ends of said interconnecting strut and operable to move said sleeve drive member in an orbital path.

6. A sleeve valve engine having a crankshaft and horizontal opposed engine cylinders offset axially with respect to said crankshaft, sleeve valves operable in said cylinders, a sleeve drive member consisting of a pair of sleeve actuating arms and an interconnecting strut, a pair of eccentrically rotating driving instrumentalities connected with said member and driving same in an orbital path to impart a combined reciprocating and oscillating movement to said sleeve valves.

7. A sleeve valve engine having a crankshaft and a pair of horizontally opposed engine cylinders offset axially of said crankshaft, sleeve valves operable in said cylinders, a sleeve drive member operatively connected with said sleeve valves in said opposed engine cylinders and including a strut extending transversely of said crankshaft, and a pair of parallel valve shafts one on each side of said crankshaft for driving said sleeve drive member.

8. A sleeve valve engine having a crankshaft and a pair of horizontally opposed engine cylinders offset axially of said crankshaft, sleeve valves operable in said cylinders, a sleeve drive member operatively connected with said sleeve valves in said opposed engine cylinders and including a strut extending diagonally transverse of said crankshaft, and means for actuating said sleeve drive member.

9. A sleeve valve engine having a crankshaft and a pair of horizontally opposed engine cylinders offset axially of said crankshaft, sleeve valves operable in said cylinders, a sleeve drive member operatively connected with said sleeve valves in said opposed engine cylinders and including a strut extending diagonally transverse of said crankshaft, and means for actuating said sleeve drive member, the connections between the sleeve valves and member consisting of pins projecting in opposite directions from the extremities of said sleeve drive member.

EDWARD T. VINCENT.